United States Patent Office 3,526,514
Patented Sept. 1, 1970

3,526,514
FLAVORED INSTANT GRAIN PRODUCTS
Bruce G. Gralak, Carpentersville, and Roy G. Hyldon, Crystal Lake, Ill., assignors to The Quaker Oats Company, Chicago, Ill., a corporation of New Jersey
No Drawing. Filed Apr. 2, 1968, Ser. No. 718,239
Int. Cl. A23l 1/10
U.S. Cl. 99—83          7 Claims

ABSTRACT OF THE DISCLOSURE

A flavored instant grain product is produced by: (A) denaturing a grain such as corn, rice, barley, or wheat; (B) adding the denatured grain to critical amounts of a thickening agent, water and critical amounts of either fruit preserves, fruit juice, or pulped fruit; (C) cooking the mixture on a drum drier, and (D) comminuting the cooked dried product.

BACKGROUND OF THE INVENTION

Field of the invention

This invention relates to flavored instant grain products and a process for preparing the products.

Description of the prior art

Many attempts have been made to produce good tasting and truly "instant" flavored grain products. By the term "flavored instant grain" as used herein, we intend to mean products which have the texture and taste characteristics of fresh fruit in cooked grain. The grains that we refer to herein include corn, rice, barley, and wheat. Prior attempts have gone far toward reducing the required cooking time for such products, but they have failed to produce a truly "instant" product, i.e. a product which can be prepared in the bowl without a cooking step by the consumer. Although prior attempts have been successful in reducing the cooking time of flavored instant grain products, this has generally been accomplished at the expense of texture and flavor characteristics. Prior to our invention, therefore, there has been a definite need for flavored instant grain products that have excellent flavor and texture characteristics.

Several different approaches have been used in order to produce instant grain products. Among the latest and more advanced of these approaches is the one described in U.S. Pat. No. 2,890,118, issued to Cantor et al., in which it is taught that the required cooking time of wheat farina can be reduced by addition thereto of certain thickening and suspending agents such as gums. While this approach has greatly reduced the cooking time required for grain products, and wheat farina in particular, the product must still be cooked by the consumer. Prior to our invention, therefore, there have been no known acceptable flavored instant grain products which free the consumer from the dirty pots and pans necessary in cooking prior grain products. There has thus existed a great need for flavored instant grain products that still have good flavor and texture characteristics.

Prior to our invention, attempts to produce flavored instant grain products have proceeded along three general routes. The first and probably most popular of these consists mainly in injecting a synthetic flavor into the product at some point during the processing the product. This has generally led to products which have an "artificial" or "false" taste which approaches but does not reach the taste of fresh fruit is cooked grain. These products do not present either a good texture or a desirable "body" in taste characteristics, and therefore they are ultimately rejected by the consumer.

A second prior known route for providing flavored instant grain products places the flavoring burden on the consumer. This route consists in directing the consumer to actually place fresh fruit in the product after it is prepared. This method is obviously more expensive and more troublesome for the consumer and thus results in rejection of the product by the consumer.

A third and little used method for producing flavored instant grain products consists in placing fresh or dehydrated fruit in the packaged product. Inclusion of fresh fruit in the product has led to considerable spoilage while inclusion of dehydrated fruit has led to the "off" taste often associated with dehydrated fruit. It may thus be seen that all known prior attempts have failed to produce a good tasting flavored instant grain product which has the taste and texture of fresh fruit in cooked grain.

SUMMARY OF THE INVENTION

It is an object of this invention to produce flavored instant grain products which can be rehydrated by mere addition thereto of water.

It is another object of this invention to produce flavored instant grain products which have excellent flavor and texture characteristics.

It is a further object of this invention to provide a process for producing flavored instant grain products.

The objects of this invention are accomplished by a process comprising the steps:

(A) Denaturing a grain by a heat-moisture treatment, said grain comprising a member selected from the group consisting essentially of barley, corn, rice and wheat;

(B) Admixing from 0.1 to 10.0 parts by weight of a thickening agent, from 50 to 300 parts by weight water, and from 90 to 99.9 parts by weight of the denatured grain with a fruit constituent, said fruit constituent comprising a member selected from the group (1) fruit preserves, said fruit preserves being added in an amount of from 4.5 to 40 parts by weight, (2) fruit juice, said fruit juice being added in an amount of from 4.5 to 40 parts by weight, and (3) pulped fruit, said pulped fruit being added in an amount of from 10 to 100 parts by weight;

(C) Cooking the mixture of denatured grain, thickening agent, water, and fruit constituent by forming it in a thin sheet on an internally heated, rotating drum drier, said thin sheet being formed with a thickness of 8% by weight water content of from 0.010 to 0.025 inch, and said cooking being sufficient to reduced the moisture content to below 10 percent water by weight;

(D) Comminuting the cooked product to form a flavored instant grain product which will rehydrate to have excellent flavor and texture characteristics.

By the term "instant" as used herein, we intend to mean a product that does not require a cooking step by the consumer, i.e. a product that can be prepared for use simply by adding water to it and mixing it in the cereal bowl.

We have found that the steps of our process are critical, including both the order of the steps and the ingredients used therein. Furthermore, we have found that our new and unique product can be produced only by our new process. Simple mixing of the ingredients does not produce an acceptable product. Neither does simple mixing of the ingredients plus cooking in a pan or oven produce an acceptable product. Our invention, therefore, consists of a new and useful process and a product produced by the process.

Attempts by others to produce instant grain products have included the addition of certain thickening agents to the grains. These thickening agents include most of the natural and synthetic gums, and the thickening agents are generally held to be interchangeable, i.e. one can be substituted for another. We have found, however, that mere inclusion of a thickening agent to the grain (i.e.

barely, corn, rice or wheat) is not sufficient to produce an instant grain product as defined herein. We have found that it is only when a proper thickening agent is utilized in accordance with our process that an acceptable instant grain product results. The thickening agents that we have found to be acceptable for use in this invention must be capable of hydrating rapidly with water, must be edible, and must not be completely degraded by highly ionic substances such as sodium chloride. The thickening agents that we have found to exhibit these properties include the edible polysaccharide gums and salts thereof. Edible polysaccharide gums include both true gums of vegetable origin and synthetic gums such as carboxymethylcellulose (the preferred thickening agent) and other cellulose derivatives which approximate the vegetable gums in physical and chemical properties. Both types of gums are acceptable for use in this invention.

"True gums" are gums of vegetable origin which are soluble in water or swell in contact with water to form viscous colloidal solutions. They are insoluble in oils, alcohol, benzene and other organic solvents. A general classification of such gums is as follows:

(A) Plant gums—dried extrudates from certain trees or shrubs in the form of tears, flakes, or annular fragments that have been formed by bark fissures or incisions. The more important ones include acacia (gum arabic), Australian, cape, carmania, gedda, ghatti, karaya, mesquite, mogadore, Persian, shiraz, talha, and tragacanth. Others of lesser importance include amrad, angico, apricot, brea, cashew, cebil, cedar, chagual, cherry, damson, jeol, mango, plum, and sassa.

(B) Plant mucilages—derived from seeds, roots or other plant parts usually by extraction with water. This class includes althea root, chia seed, Iceland moss, linseed (flaxseed), locust bean, psyllium seed, quince seed, slippery elm bark and guar bean.

(C) Mucilaginous materials known as hydrophylic colloids obtained from two general groups of brown and red algae. This class includes agar, Irish moss (carrageen), and algin.

When the source material from gum is acidic, i.e. algin and Irish moss, the commercially available edible gum is a derivative of the acid such as a soluble salt or ester, i.e. propylene glycol ester of alginic acid. In general, to be satisfactory, and gum employed must be edible, have no undesirable flavor, disperse rapidly in hot water, and not be completely degraded by highly ionic substances such as sodium chloride.

While any thickening agent having the above-described qualities is acceptable, we have found that the preferred agent is a mixture of from 1 to 5 parts by weight of carboxymethylcellulose with from 1 to 4 parts by weight sodium chloride ($N_aCl$). This preferred agent is added to from 90 to 99.9 parts by weight denatured grain in the preferred embodiment. When referring to carboxymethylcellulose, it is to be understood that we are referring to this agent in its commercially pure form or in the form that it is generally used commercially, such as the alkali metal salt of carboxymethylcellulose, i.e. sodium carboxymethylcellulose.

Our thickening agent, and the limitations placed thereon, are also unusual. Normally, the use of thickening agents in processing requires that the thickening agent be subjected to an activation, geldation, thickening, or preheating step in order to activate the thickening agent before it is introduced into the process. Our process does not require this separate step of treatment of the thickening agent before use of such agent. Also, starches are generally held to be interchangeable with most thickening agents, whereas starches are completely unacceptable for use as thickening agents in our process.

The grain used herein can be any of the grains of the group consisting of barely, corn, rice, and wheat. For use herein, the grain is subdivided and processed by conventional methods until it consists of coarsely ground bolted endosperm substantially free from flour and bran. Prior to use of the grain in this process, it is preferred that the grain be subdivided until at least about 90 percent by weight of the grain will pass through a U.S. No. 10 sieve. It is further preferred that the grain be subdivided until it gives a creamy texture upon prolonged cooking, i.e. more than five minutes cooking.

The grain as used herein must be denatured. While any commercially available denaturing process is acceptable, we prefer to use a heat and moisture treatment. This denaturation consists in a series of changes in the grain protein molecule brought about by the heat and moisture. These changes often consist in the opening up and extension of the highly organized coiled polypeptide chains of the native protein, which affects the viscosity, particle size, solubility, resistance to proteolytic enzymes, formation and disappearance of sulfhydril groups, and possible loss of certain amino acids or peptides of relatively low molecular weight. As used herein, the denaturation process is also irreversible. Also, while it is critical that the grain protein be denatured, the denaturation must not be so severe as to cause gelatinization of the grain starch, a property which at this point in the process would be so adverse to the desired properties that it would render the product unacceptable.

The denatured grain is thoroughly mixed with a thickening agent, water, and a fruit constituent. For each 90 to 99.9 parts by weight of the denatured grain in this mixture, the fruit constituent comprises either (1) from 4.5 to 40 parts by weight of fruit preserves, (2) from 4.5 to 40 parts by weight fruit juice, or (3) from 10 to 100 parts by weight pulped fruit.

Addition of a fruit constituent in the amounts above defined and in the process herein defined is both new and unusual. Normally, it would be thought to be very undesirable to attempt to add such a fruit constituent to a starch product prior to a drum drying operation. The reason for this is much the same as the reasons hereinafter discussed with regard to the unobviousness of the drum drying of starch products. Since the application of drum drying to products consisting of discrete particles in a starch matrix has some very strict and critical limits both as to the process and the ingredient contents, one would not likely attempt to add an additional ingredient and upset this balance. This is particularly true when the new ingredient is very high in moisture content as is the fruit constitutent herein. This is also even more important when one attempts to add a new ingredient having a high sugar content. The fruit constituent used herein has both natural and added sugars therein making it even less likely that one would attempt to make this addition to a drum drying process.

The amounts of fruit constituent used herein are also unusual to a drum drying type operation. The lower limits on each of the fruit constituents are unusual in that they represent a rather small percentage of the total product, and when heated, this small amount of flavoring would not normally be expected to influence taste. On the other hand, the upper limits that we have found for the fruit constituent represent such a high percentage of the product and such an additions of moisture that they would be unusual for inclusion in a critical drying process such as is represented by our invention and such as is defined herein.

By the term "fruit preserves" as used herein, we intend to mean fruit that has been preserved in a sweetening ingredient. Any of the common fruit preserves or jams can be used in our process. The more popular fruit preserves that may be used in our process include apple, apricot, blackberry, boysenberry, cherry, currant, plum, elderberry, fig, gooseberry, grape, guava, loganberry, nectarine, peach, pear, pineapple, quince, raspberry, strawberry, and other flavors. The term "fruit preserves" as used herein is intended to mean both preserves and jams. Typically, the preserves or jams have at least 45 parts by weight fresh, frozen or canned fruit ingredients to each 55 parts by weight of sweetening agent. The sweetening agent in the preserves may be sucrose, invert sugar syrup, dextrose, or corn syrup. Such fruit preserves normally have about 60 to 70 percent by weight solids. More particularly, by the term "fruit preserves" as used herein, we intend to mean fruit preserves or fruit jams of the type and quality one would normally purchase at a retail grocery store. For use herein, the fruit preserves or fruit jam should be finely divided or pulped before introduction into the process.

By the term "fruit juice" as used herein, we intend to mean fruit juice or reconstituted or non-reconstituted fruit juice concentrate. The fruit juice as used herein is the common consumer product with the exception that it need not exclude finely divided pieces of fruit therein. Any flavor of fruit juice may be used including those flavors hereinbefore discussed with regards to fruit preserves.

By the term "pulped fruit" as used herein, we intend to mean fruit which has been reduced, subdivided, or mashed until it generally has no particle of a diameter greater than about ¼ to ½ inch. The pulped fruit may have some of the juice extracted during the pulping process, but this is not necessary. Typical of the pulped fruits are products having the texture characteristic of commercial applesauce. The pulped fruit may be any of the commonly known fruits, particularly those mentioned hereinabove with regards to fruit preserves. If desired, the pulped fruit may be sweetened. In such a case, we have found that from 1 to 30 parts by weight sugar is sufficient to acceptably sweeten from 10 to 100 parts of pulped fruit.

It may be seen that our product differs significantly from prior attempts to produce flavored instant grain products. These differences include the precooking or denaturing of the grain, the use of the denatured grain in a subdivided state, and the inclusion of critical amounts of an acceptable thickening agent and fruit constituent, all of which when added according to our process result in new and unique products heretofore not known.

The process steps, as are herein defined, are critical. First the grain must be denatured. While any commercial denaturation process is acceptable, it is preferred that this be by a heat-moisture treatment. We have found that one such heat-moisture treatment can be accomplished by introducing the grain into a rotating screw mixer-conveyor supplied with steam injection ports and exposing the grain to steam (25 p.s.i.g. immediately prior to injection) at atmosphereic pressure for from 3 to 5 minutes.

The next step in our process, is the mixing of the denatured grain, as hereinabove described, with the thickening agent and fruit constituent. Any type of mixing operation which can thoroughly mix these ingredients is acceptable. The mixture must be sufficiently mixed so that the denatured grain uniformly contributes 90 to 99.9 parts by weight, the thickening agent contributes from 0.1 to 10 parts by weight, and the fruit constituent comprises either from 4.5 to 40 parts by weight fruit preserves, from 4.5 to 40 parts by weight fruit juice, or from 10 to 100 parts by weight fruit juice. While any thorough mixing process is acceptable, the preferred mixing step is accomplished by adding the mixture to 50 to 300 parts by weight water and thoroughly mixing the resulting slurry. This slurry, when fully mixed, has a viscosity much like that of wheat farina that is prepared for consumption, except that with the lower water content, the slurry becomes thicker than prepared farina.

The next step of this new and unique process consists of cooking the heretofore described grain-thickening agent-water-fruit constituent mixture. By use of the term "cooking" we intend to refer to heat treatment which causes a loss of birefringence but is not so severe as to produce transparency of the grain particles. The limits on such a treatment must be equivalent to those hereinbelow defined. The cooking can be accomplished in either of two acceptable methods. One method utilizes a precooking step, such as steam injection, followed by cooking on a rotating drum drier. The other method simply utilizes a drum drying process without precooking. The preferred cooking step is to first subject the mixture to steam injection (a rotating screw conveyor supplied with steam ports is acceptable for this) and then form the mixture in a thin sheet on a temperature-controlled plate such as an internally-heated, rotating drum drier. By use of the term drum drier, we intend to mean any temperature controlled plate on which the grain can be placed to be cooked and dried to a moisture content of less than 10 percent by weight. This exposure must have a sufficient temperature-time contact to cook the mixture. Also, the thin sheet so formed must have a thickness at 8 percent by weight water content of from 0.010 to 0.025 inch. While we have found that exposure for 20 seconds at 143° C. is sufficient to produce the desired properties, this temperature and time may be altered as long as approximately the same amount of cooking and drying (i.e. down to below 10 percent by weight moisture) are accomplished.

To our knowledge the use of an internally-heated, rotating drum drier on a product such as discrete grain particles in a starch matrix mixture is of itself new and unusual. Normally, one would not attempt to cook or dry a product containing discrete particles in a starch matrix on a drum drier because the particles would tend to cause unevenness and tears in the starchy sheet and would thus result either in no product or a product so nonuniform and with such poor quality that it would be totally unacceptable. Also, it is not normally considered desirable to use a drum drying process for high solids content (i.e. more than 25 but less than 80 percent by weight solids) products. While the use of a drum drier for high solids content products (consisting of discrete particles in a starch matrix) is not common, we have found it most desirable and necessary for arriving at a good flavored instant grain product.

When referring to thickness of the thin sheet, as used herein, we intend to mean thickness of the discrete grain particles in the sheet. For a thickness of 0.010 to 0.025 inch, the starch matrix surrounding the discrete grain particles is generally found to have a thickness of about 0.003 to 0.004 inch.

The final step in our process consists in taking the cooked and dried flavored grain product which leaves the above step in the form of a sheet and comminuting the sheet to give a particle size which will give a smooth or creamy texture upon rehydration. We have found that comminution of the sheet until at least about 90 percent by weight of the sheet will pass through a U.S. No. 10 sieve is acceptable, but other degrees of comminution are likewise acceptable depending on the desired texture of the finished product. Any of the commercially available comminuting machines are acceptable for this step.

Any additional additives such as vitamins and antioxidants may be added either in the mixing step prior to cooking or dry-blended with the product after it is comminuted. If, however, it is desired or preferred to produce a fortified flavored instant grain product, non-fat dry milk solids or soybean protein should be added in an amount sufficient to create a final protein level of from 10 to 20 percent by weight.

The use of critical amounts of specific ingredients in critical processing steps makes our new and unique process the first known really desirable process for producing acceptable flavored instant grain products.

DESCRIPTION OF THE PREFERRED EMBODIMENTS

This invention is more fully explained but is not limited by the following preferred embodiments.

Example 1.—A sample of wheat farina was denatured by passing it through a screw conveyor supplied with steam ports (Thermascrew, Reitz Manufacturing Co.) and exposing it to atmospheric pressure steam (25 p.s.i.g. immediately prior to injection) for about 4 minutes. Ninety-one parts by weight of this denatured wheat farina was mixed with 4.0 parts by weight NaCl, 2.5 parts by weight sodium carboxymethylcellulose (CMC–7HOF, Hercules, Inc.) 230 parts by weight water, 18.2 parts by weight black raspberry preserves (Yummy brand, Jewel Tea Co., Inc., N.Y.), and minor amounts of flavoring and antioxidizing ingredients. The mixture at this point is a thick dispersion which approaches the viscosity characteristics of prepared wheat farina. This mixture was then passed onto an internally-heated, rotating drum drier and cooked thereon. The drier was heated to a surface temperature of about 143° C., and contact time was about 0.33 minute, giving a final moisture content of the finished product of about 8 percent by weight. The product thickness at this point was 0.015 inch. This product was then comminuted and packaged.

Example 2.—Example 1 was repeated with the exception that the fruit constituent was red raspberry preserves (Yummy brand, Jewel Tea Co., Inc., N.Y.).

Example 3.—Example 1 was repeated with the exception that the fruit constituent was apricot preserves (Yummy brand, Jewel Tea Co., Inc., N.Y.).

Example 4.—Example 1 was repeated with the exception that the fruit constituent was cherry preserves (Yummy brand, Jewel Tea Co., Inc., N.Y.).

Example 5.—Example 1 was repeated with the exception that the fruit constituent was strawberry preserves (Yummy brand, Jewel Tea Co., Inc., N.Y.).

Example 6.—Example 1 was repeated with the exception that the fruit constituent was orange marmalade.

Example 7.—Example 1 was repeated with the exception that the fruit constituent was strawberry juice concentrate, and the strawberry juice concentrate was added in an amount of 12.8 parts by weight (density of the juice concentrate about 1.07 gm./cc.).

Example 8.—Example 1 was repeated with the exception that the fruit constituent was apple juice concentrate, and the apple juice concentrate was added in an amount of 39.6 parts by weight (density of the juice concentrate about 1.08 gm./cc.).

Example 9.—Example 1 was repeated with the exception that the fruit constituent was frozen, blanched apples (about 20 percent by weight solids) which had been thawed and finely pulped, and the pulped apples were added in an amount of 100 parts by weight.

Example 10.—Example 1 was repeated with the exception that the fruit constituent was pulped strawberries, and the strawberries were added in an amount of 70 parts by weight.

Example 11.—Example 10 was repeated with the exception that the grain was rice.

Example 12.—Example 1 was repeated with the exception that the thickening agent was guar gum (Jaguar J2S1, Stein, Hall and Co., Inc.).

Example 13.—Example 1 was repeated with the exception that the thickening agent was sodium alginate (Kelcosol, Kelco Co., Inc.).

The above produced, flavored instant grain products were prepared as follows: 21 grams of the product was placed in a bowl. One-half cup of boiling water was added and the product was then stirred and set aside for 30 seconds. Two tablespoons of milk was added for flavor, and in each case the result was a flavored instant grain product having excellent flavor and texture and tasting like fresh fruit in cooked grain. The 30 seconds waiting time is preferred to assure full water absorption by the product. Unlike other "instant" grain products, this product does not require a special bowl for critical heat balance requirements.

It may thus be seen that we have discovered a new and unique process for making flavored instant grain products and that our process produces a product which has properties superior to those of any prior-known flavored grain products.

Therefore, we claim:

1. A process for producing a flavored instant grain product which will readily rehydrate with room-temperature water, said process comprising the steps:
    (A) denaturing a grain by a heat-moisture treatment, said grain comprising a member selected from the group consisting essentially of comminuted barley, corn, rice, and wheat;
    (B) admixing from 0.1 to 10.0 parts by weight of a thickening agent comprising an edible polysaccharide gum or salt thereof, from 50 to 300 parts by weight water, and from 90 to 99.9 parts by weight of the denatured grain with a fruit constituent, said fruit constituent comprising a member selected from the group (1) fruit preserves, said fruit preserves being added in an amount of from 4.5 to 40 parts by weight, (2) fruit juice, said fruit juice being added in an amount of from 4.5 to 40 parts by weight, and (3) pulped fruit, said pulped fruit being added in an amount of from 10 to 100 parts by weight;
    (C) cooking the mixture of denatured grain, thickening agent, water, and fruit constituent by forming it in a thin sheet on an internally heated, rotating drum drier, said thin sheet being formed with a thickness at 8% by weight water content of from 0.010 to 0.025 inch, and said cooking being sufficient to reduce the moisture content to below 10 percent water by weight; and
    (D) comminuting the cooked product to form a flavored instant grain product which will rehydrate to have excellent flavor and texture characteristics.

2. A process as in claim 1 wherein the thickening agent is an edible polysaccharide gum.

3. A process as in claim 1 wherein the thickening agent comprises from one to five parts by weight of carboxymethylcellulose and from one to four parts by weight sodium chloride.

4. A process as in claim 3 wherein the fruit constituent comprises fruit preserves.

5. A process as in claim 3 wherein the fruit constituent comprises fruit juice.

6. A process as in claim 3 wherein the fruit constituent comprises pulped fruit.

7. A flavored instant grain product produced in accordance with the process as defined in claim 1.

References Cited

UNITED STATES PATENTS

| | | | |
|---|---|---|---|
| 2,890,118 | 6/1959 | Cantor et al. | 99—83 |
| 2,999,018 | 9/1961 | Huffman et al. | 99—83 |

RAYMOND N. JONES, Primary Examiner

J. R. HOFFMAN, Assistant Examiner